(12) United States Patent
Ackermann

(10) Patent No.: US 9,085,931 B2
(45) Date of Patent: Jul. 21, 2015

(54) SYSTEM AND METHOD FOR CONTROLLING A SHADING DEVICE

(75) Inventor: Bernd Ackermann, Aachen (DE)

(73) Assignee: Koninklijke Philips N.V., Eindhoven (NL)

( * ) Notice: Subject to any disclaimer, the term of this patent is extended or adjusted under 35 U.S.C. 154(b) by 724 days.

(21) Appl. No.: 13/262,884

(22) PCT Filed: Mar. 15, 2010

(86) PCT No.: PCT/IB2010/051094
§ 371 (c)(1),
(2), (4) Date: Oct. 4, 2011

(87) PCT Pub. No.: WO2010/116274
PCT Pub. Date: Oct. 14, 2010

(65) Prior Publication Data
US 2012/0029704 A1    Feb. 2, 2012

(30) Foreign Application Priority Data

Apr. 7, 2009  (EP) .................................. 09157457

(51) Int. Cl.
*G05B 13/00* (2006.01)
*E06B 9/322* (2006.01)

(52) U.S. Cl.
CPC ...................... *E06B 9/322* (2013.01)

(58) Field of Classification Search
CPC ............ Y02B 80/50; E06B 9/322; E06B 9/32
USPC ........................................ 700/275
See application file for complete search history.

(56) References Cited

U.S. PATENT DOCUMENTS

| 5,142,133 | A | 8/1992 | Kern et al. |
| 7,111,952 | B2 * | 9/2006 | Veskovic ........................ 362/1 |
| 7,672,507 | B2 * | 3/2010 | Fan .............. 382/164 |
| 2005/0110416 | A1 | 5/2005 | Veskovic et al. |
| 2006/0226790 | A1 * | 10/2006 | Prouse ......................... 315/291 |
| 2007/0211447 | A1 * | 9/2007 | Veskovic ........................ 362/1 |
| 2008/0266240 | A1 * | 10/2008 | Chen et al. .................... 345/102 |
| 2009/0020233 | A1 | 1/2009 | Berman et al. |
| 2010/0165099 | A1 * | 7/2010 | Marchthaler et al. ......... 348/135 |
| 2011/0249120 | A1 * | 10/2011 | Bingle et al. .................. 348/148 |

FOREIGN PATENT DOCUMENTS

| DE | 102004023185 B3 | 8/2005 |
| JP | 2005054356 A | 3/2005 |
| JP | 2007093352 A | 4/2007 |
| RU | 95101170 A | 12/1996 |
| WO | 2005014319 A1 | 2/2005 |
| WO | 2008149285 A1 | 12/2008 |
| WO | WO 2008149285 A1 * | 12/2008 |

OTHER PUBLICATIONS

McGuire, "A system for Optimizing Interior daylight distribution using reflective Venetian blinds with independent blind angle control" MIT, Jun. 2005. Please see "Abstract" + p. 18, line 17 to 19 on p. 18, Last Para on p. 81.

* cited by examiner

*Primary Examiner* — Robert Fennema
*Assistant Examiner* — Sivalingam Sivanesan

(57) ABSTRACT

The invention describes a system for controlling a shading device with a plurality of controllable shading elements. To provide a system for controlling a shading device, which reduces direct sunlight transmission and enhances thermal comfort and lighting conditions, the system comprises at least one detector unit for providing an image signal of a shading area and a control unit (5) being configured to receive said image signal, determine from said signal, whether a characteristic pattern is present in said shading area and in case said characteristic pattern is determined, control said shading elements to reduce said characteristic pattern.

15 Claims, 3 Drawing Sheets

SYSTEM AND METHOD FOR CONTROLLING A SHADING DEVICE

FIELD OF THE INVENTION

The invention relates to a system and a method for controlling a shading device with a plurality of controllable shading elements.

BACKGROUND OF THE INVENTION

Shading devices, such as blinds, are used in a variety of commercial and household applications to keep excessive light and heat out of building structures, such as for example office buildings. Usually, shading devices are mounted either interior or exterior of windows or between the window panes and are controllable so that the amount of sunlight entering the building can be adjusted manually or using a suitable controlling system.

Automatic controlling systems are known in the art, which control shading devices according to one or more measured environmental parameters, such as daylight conditions, wind or according to global building control settings or user preferences. Document WO 2008/149285 A1 discloses a controllable window blind having multiple slats, in which a tilt angle of said slats is controlled in response to the detected interior light intensity.

However, a problem exists because even when the interior light intensity is suitably controlled, it may nevertheless be possible that direct light, e.g. sunlight, is transmitted through a shading device, which may cause overheating or glare on work desks and other specular surfaces, such as computer monitors, resulting in a substantial disturbance or discomfort, especially in office environments.

It is therefore an object of the present invention to provide a system for controlling a shading device, which reduces direct sunlight transmission and enhances thermal comfort and lighting conditions.

SUMMARY OF THE INVENTION

The object is solved by a system for controlling a shading device according to claims 1, 10 and corresponding methods of controlling a shading device according to claims 9 and 11. Dependent claims relate to preferred embodiments of the invention.

The basic idea of the inventive system is to reduce direct light transmission through a shading device with a plurality of controllable shading elements by detecting a characteristic pattern caused by said direct light transmission and controlling the shading elements to reduce said characteristic pattern. In this context, the term "direct light transmission" or "direct light" refers to light from a directed source, such as sunlight.

According to the invention, the system for controlling a shading device with a plurality of controllable shading elements comprises at least one detector unit for providing an image signal of a shading area and a control unit, configured to receive said image signal. The control unit determines from said signal whether a characteristic pattern is present in said shading area and in case said characteristic pattern is determined, controls said shading elements to reduce said characteristic pattern.

The inventive system thus allows to reduce or preferably eliminate direct sunlight transmission, so that thermal discomfort and glare resulting thereof can be advantageously reduced.

In the context of the present invention, the term "shading area" refers to any area or spatial section of e. g. the interior of a building structure, which is at least partly shaded by said shading device. For example, the shading area may be an office room shaded by a shading device from sunlight, transmitted through a window opening in the facade. The shading area may also refer to only part of a room, such as a workspace area or desk area to reduce glare in certain sections of interest, depending on the application. The term "shading area" may further refer to a section of a room, shaded by said shading device and particularly suitable for a reliable detection of said characteristic pattern, such as e.g. a window frame.

The detector unit may be of any suitable type for providing an image signal of said shading area, such as e.g. a camera, a CCD line array sensor or a large area sensor based on organic photodiodes, amorphous silicon, thick or thin film printing. Depending on the size or geometry of the shading area to be observed, certainly multiple detector units may be used, although the number of detector units is preferably kept small to reduce the overall complexity of the system.

The image signal allows to determine, whether a characteristic pattern is present in said shading area. The at least one detector unit may thus be configured to provide a color image signal, a grayscale image signal or even only a one dimensional array of pixels, e.g. obtained by a suitable linear sensor, as long as an identification of the characteristic pattern is possible.

The at least one detector unit provides the image signal to the control unit, e.g. by a suitable connection. The connection may be wired or wireless, for example an UART, SPI, LAN, W-LAN, DALI, Zigbee, Bluetooth or any other suitable type of permanent or temporary data connection.

Once the image signal is received, the control unit determines from said signal, whether a characteristic pattern is present in said shading area, resulting from e.g. direct sunlight transmission.

In the context of the present invention, the term "characteristic pattern" refers to a pattern, which results from the characteristic image of direct light, transmitted through the respective shading device having multiple shading elements. Said characteristic pattern depends on the type of shading device used and particularly on the shape of said shading elements, so that the control unit should be adapted to detect the pattern according to the specific type of shading device used.

The characteristic pattern may be a periodic pattern of areas of high luminance, alternating with areas of low luminance, resulting from direct light, transmitted through said shading device and alternating with the shadows of said multiple shading elements. For example, in case the shading device is a slat blind, the characteristic pattern is a bright/dark stripe pattern.

The control unit may be configured to determine the presence of the characteristic pattern by any suitable method. Preferably, the control unit comprises image recognition circuitry, which compares the image signal with a defined set of parameters, so that said characteristic pattern can be reliably detected. Alternatively, the control unit may be configured to "learn" the characteristic pattern by comparing images of said shading area with and without the characteristic pattern. For example, a bright/dark stripe pattern may be detected by applying edge detection to the image and identifying a number of parallel edges with a regular spacing. Edge detection and further image analysis methods are described in: "L. O'Gorman, M. J. Sammon, M. Seul, Practical Algorithms for Image Analysis, Cambridge University Press, 2008", incorporated by reference.

According to the invention, the control unit drives or controls said shading elements to reduce the characteristic pattern, once the presence thereof is determined. Therefore, the control unit may be connected to the shading device using a suitable permanent or temporary control connection, for example a connection of one of the types discussed above.

The control of the shading elements may preferably be conducted in a closed-loop operation, i.e. the shading elements are controlled and a corresponding image signal is obtained, so that a reduction of the characteristic pattern can be determined by said control unit.

Alternatively, the control unit may be configured to control the shading elements according to one or more presets. For example, the shading elements may be driven to a completely closed position once the pattern is detected, so that the characteristic pattern is eliminated.

The control unit may be of any suitable type, allowing to determine said characteristic pattern and to control the shading elements as discussed above. For example, the control unit may comprise a computer or a microprocessor together with a suitable programming.

Although the control unit and the detector unit have been described before as separate components, the two units may be formed integrally or may be integrated with further components. For example, the control unit and/or the detector unit may be integrated with the shading device to obtain a very compact system.

The control unit certainly may be configured to control more than one shading device or to control only some of the shading elements of a shading device, for example in case that a first group of shading elements is used for shading and a second group is used for redirecting light, sometimes referred to as "daylight harvesting". Especially in this case, the first group may advantageously be controlled according to the present invention, while the second group may be controlled manually or by a suitable method, for example as described in: "A System for Optimizing Interior Daylight Distribution Using Reflective Venetian Blinds with Independent Blind Angle Control", by Molly E. McGuire, Master Thesis at the Massachusetts Institute of Technology, June 2005 and the references cited therein, incorporated herein by reference. The control unit may in this case preferably be adapted to control said first and second group.

Further, the control unit may be connected to a central control system to obtain overall control settings for the entire building, e.g. to control exterior shading devices to a safe position in the case of strong winds.

The inventive system may certainly comprise further components, for example further detectors for detecting environmental parameters, e.g. luminance, interior or exterior temperature, wind, suitable interfaces to central control systems, manual controllers, etc.

The system according to the invention may be used to control any type of shading device with a plurality of separate shading elements, having at least one controllable parameter. The shading device may be for example a roller shutter, a pleated blind or a vertical or horizontal slat blind, as long as at least one parameter of said shading elements is controllable. The invention is particularly suitable for use with horizontal slat blinds, also denoted as "venetian blinds".

The controllable parameter may be for example the open/closed state, height to which the shading elements are lowered or any other suitable controllable parameter.

According to a preferred embodiment of the invention, at least the angular position of the shading elements is controllable and the control unit is adapted to control at least the angular position to reduce the characteristic pattern. A control of the angular position reliably allows to reduce said characteristic pattern especially in the case of sunlight, whose angle of incidence varies over the day and year.

Preferably, the characteristic pattern is a stripe pattern, for example formed by a slat blind. The control unit is most preferably configured to determine whether a stripe pattern is present by detecting the contrast ratio of the stripes of the stripe pattern and in case the contrast ratio is higher than a maximum contrast threshold, to control said shading elements to reduce said stripe pattern.

The determination of the contrast ratio, i.e. the luminance contrast ratio of the stripes of the stripe pattern allows a further enhanced detection of direct light, resulting in a substantial discomfort.

In the context of the present invention, the term "stripe pattern" refers to a pattern of at least four alternating stripes of high and low luminance. The geometry of the stripes certainly depends on the type of the shading device used, the angle of incident light and the position of the observed shading area in relation to the shading device.

The control unit may preferably be configured to determine the median luminance of multiple stripes having a low luminance and comparing the resulting value with a median luminance of multiple stripes having a high luminance to obtain the contrast ratio of said stripe pattern. Alternatively or additionally, the contrast ratio may be determined by comparing the stripe of the stripe pattern, showing the lowest luminance with the stripe showing the highest luminance.

To determine whether disturbing direct light is present in said shading area and a control of said shading elements is necessary, the determined contrast ratio is compared with the maximum contrast threshold.

The threshold may be set by the control unit or may be user controllable, for example using a suitable manual controller. Alternatively or additionally, the maximum contrast threshold may be set by a central control system, as described above.

The maximum contrast threshold may be chosen in dependence of the respective application. For example, while a certain degree of direct light transmission may be tolerable in a household application, any glare might be inacceptable at a computer workplace in an office environment.

Preferably, the maximum contrast threshold is 10:1 in terms of maximum contrast ratio of said bright/dark stripes of the stripe pattern, which provides an adequate protection from direct light for most applications. Most preferably, the maximum contrast threshold is 10:2, further preferred 10:3.

As mentioned above, once a stripe pattern is detected, the control unit is configured to control said shading elements to reduce the stripe pattern. Certainly, it is preferred that the shading elements are controlled so that the stripe pattern is completely eliminated and that no glare is present in the shading area. Because of the sensitivity of human luminance perception, said complete elimination of the stripe pattern corresponds approximately to a contrast ratio of equal to or lower than 10:9.

However, in many applications a defined amount of direct light transmission through said shading device might be acceptable. It is therefore preferred, that the control unit controls said shading elements to a contrast ratio below the maximum contrast threshold. This may be particularly useful when the view for a user through the shading device is important, so that e.g. users in a room with a corresponding shading device are provided with a view to the outside, enhancing the well-being of the users.

According to a development of the invention, the control unit is configured to control said shading elements, so that said contrast ratio corresponds substantially to the maximum contrast threshold. Thus, disturbing glare from direct light transmission is advantageously reduced to an acceptable level, while the view through the shading device, e.g. to the outside of a room, is maximized. In this context, the term "substantially" corresponds to slight deviations of ±10%, although it is preferred that the contrast ratio is slightly below said maximum contrast threshold.

In case of a slat blind having angular-controllable slats, sometimes referred to as "blind angle control", the slats are only closed as far as necessary to reduce glare to an acceptable level, while advantageously maximizing the view through blind.

As discussed above, a view through the shading device may be advantageous to further enhance the well-being of the users. It is therefore preferred that said shading elements are also controlled, in case said contrast ratio is lower than a minimum contrast threshold. According to the present embodiment, the system not only controls the shading elements in case the direct light transmission is high to reduce glare, but also in case the view through the shading device is limited.

The minimum contrast threshold may be chosen according to the application. Preferably, the minimum contrast ratio is 10:9, further preferred 10:5 and most preferred 10:4.

According to a development of the invention, the control unit is configured to control said shading elements, so that said contrast ratio of the stripe pattern is between 10:5 and 10:1 and preferably between 10:4 and 10:2, allowing a substantial control and reduction of glare, while simultaneously maintaining a sufficient view through the shading device.

Especially in this case, the control unit may preferably be configured to control said shading elements with a suitable hysteresis, so that e.g. a contrast ratio of 10:3 is chosen as a target contrast ratio, but a control of said shading elements is only conducted in case the contrast ratio is higher than the maximum or lower than the minimum contrast threshold.

To obtain a most compact setup of the inventive system, the detector unit may preferably be configured for mounting on a window frame. Alternatively, the detector unit may be arranged to observe a window frame.

A shading system having at least one shading device with a plurality of controllable shading elements may be provided with a system for controlling said shading device as discussed above.

An independent or additional solution to the above and other objects is discussed in a further aspect of the invention below.

The basic idea of this aspect of the inventive system is to reduce direct light transmission through a shading device with a plurality of shading elements having at least one controllable parameter by detecting the luminance in a shading area of said shading device when varying said controllable parameter and determining a suitable parameter setting from the gradient of an according luminance signal. In this context, the term "direct light transmission" or "direct light" refers to light from a directed source, such as sunlight.

The system for controlling a shading device with a plurality of shading elements according to the present aspect comprises at least one detector unit for providing a luminance signal of a shading area and a control unit. The shading elements have at least one controllable parameter.

The control unit according to the present aspect is configured to vary said at least one controllable parameter and to receive said luminance signal. The control unit calculates the gradient of said luminance signal and determines a suitable parameter setting for the shading elements from said gradient. The shading elements are controlled with the according parameter setting.

The system according to the present aspect allows reducing glare by determining a suitable parameter setting from said gradient, i.e. the variation of the luminance in said shading area when varying said controllable parameter. The gradient may thus refer to at least one value, describing the change in luminance in said shading area, so that preferably a mapping between multiple values of said controllable parameter and the associated gradient of the luminance is possible.

The detector unit may be of any suitable type for providing said luminance signal of said shading area, such as e.g. a photodiode. Depending on the size or geometry of the shading area to be observed, certainly multiple detector units may be used and the luminance signal may e.g. be formed by the average luminance signal of each of the detector units. Preferably, the detector unit is placed close to the shading device to observe at least a part of said shading area, where the ratio of direct light to indirect light is large, e.g. on the window frame.

The luminance signal allows to determine the luminance in said shading area or part thereof at least when varying the at least one controllable parameter.

The detector unit provides the luminance signal to the control unit, e.g. by a suitable connection. The connection may be wired or wireless, for example an UART, SPI, LAN, W-LAN, DALI, Zigbee, Bluetooth or any other suitable type of permanent or temporary data connection.

The control unit may be configured to determine said parameter setting by any suitable method, for example by comparing the gradient with a given threshold.

Preferably, the control unit is configured to determine a parameter setting by determining a substantial change in the gradient. The associated parameter setting corresponds to a setting of the shading elements, at which direct light is substantially blocked, while the view through the shading device is maximized.

The present embodiment is based on the conclusion that when consecutively varying the at least one controllable parameter, the luminance will basically change accordingly. The gradient, i.e. the change in luminance, is constant. When varying the controllable parameter from a setting at which direct light is transmitted through the shading device to a setting, at which substantially no direct light is transmitted, i.e. only indirect light is present in the shading area, or vice versa, a substantial change in the gradient, i.e. a sharp increase of the luminance can be noticed.

The associated parameter setting advantageously corresponds to a setting of the shading elements, where a view through the shading device is maximized, while direct light is substantially blocked.

The substantial change in gradient may be determined by any suitable method. The control unit may for example compare the gradient of the luminance signal for consecutive parameter settings and thus determine a substantial change in the gradient.

Alternatively or additionally, the control unit may be configured to calculate the second derivative of the luminance signal. The above mentioned sharp increase corresponds to a singularity or a peak in the second derivative of the luminance signal, thus the associated parameter setting may be determined by comparing the second derivative with an amplitude threshold, which may be chosen in dependence of the application.

Alternatively, said parameter setting may be determined by detecting the highest peak in the second derivative of the luminance signal. Preferably, said peak has an amplitude of twice the amplitude of all further peaks.

The system according to the invention may be used to control any type of shading device with a plurality of separate shading elements, having at least one controllable parameter. The shading device may be for example a roller shutter, a pleated blind or a vertical or horizontal slat blind, as long as at least one parameter of said shading elements is controllable. The invention is particularly suitable for use with horizontal slat blinds, also depicted as "venetian blinds".

The controllable parameter may be for example the open/closed state, height to which the shading elements are lowered or any other suitable controllable parameter. Preferably, the at least one controllable parameter is the angular position of the shading elements and the control unit is adapted to vary and to control at least said angular position.

BRIEF DESCRIPTION OF THE DRAWINGS

These and other aspects of the invention will become apparent from the following description of preferred embodiments, in which.

DETAILED DESCRIPTION OF EMBODIMENTS

Figure 1:
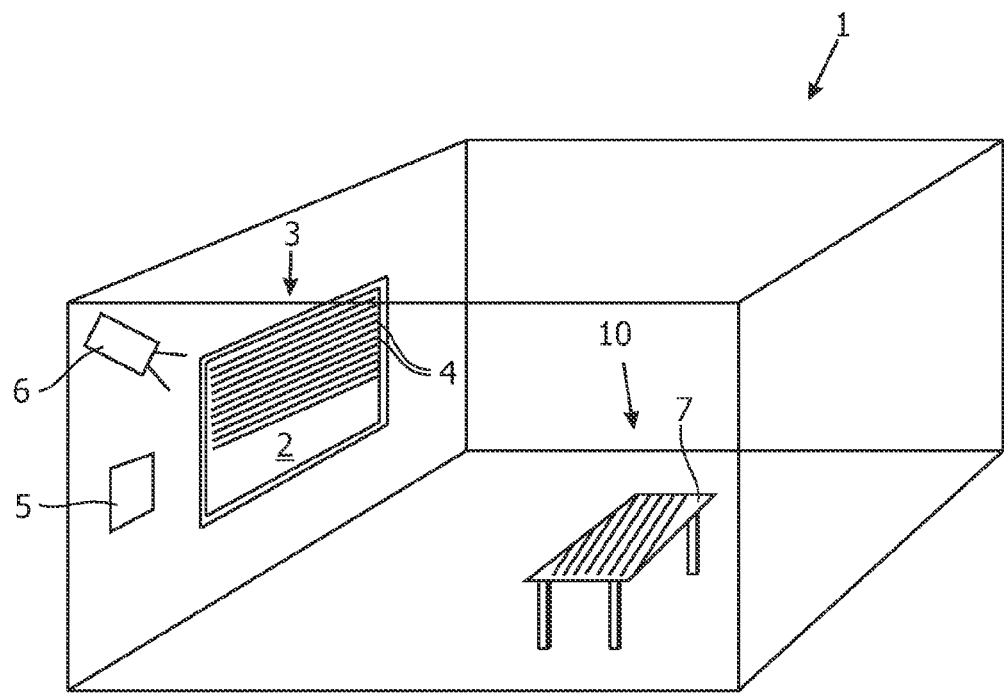
FIG. 1 shows a three-dimensional view of a first embodiment of a system for controlling a shading device according to the invention.

FIG. 1 shows a three-dimensional view of a first embodiment of a system for controlling a shading device, installed in a room 1, e.g. a room of an office building. The room 1 comprises a window 2 to the outside of the office building.

The window 2 comprises a common venetian slat blind 3, having a plurality of separate rectangular slats 4, arranged horizontally. The angle of the slats 4, i.e. the tilt angle, is controllable using an electric motor and a corresponding suspension system (not shown). Furthermore, the height to which the slats are lowered is controllable.

The slat blind 3 is connected to a control unit 5 using a wireless connection for controlling the tilt angle of the slats 4.

A CCD camera 6 is arranged to observe the room 1 and especially a desk 7, shaded by the slat blind 3 from sunlight, falling through the window 2. The camera 6 is connected to the control unit 5 using a wireless connection.

Figure 2:
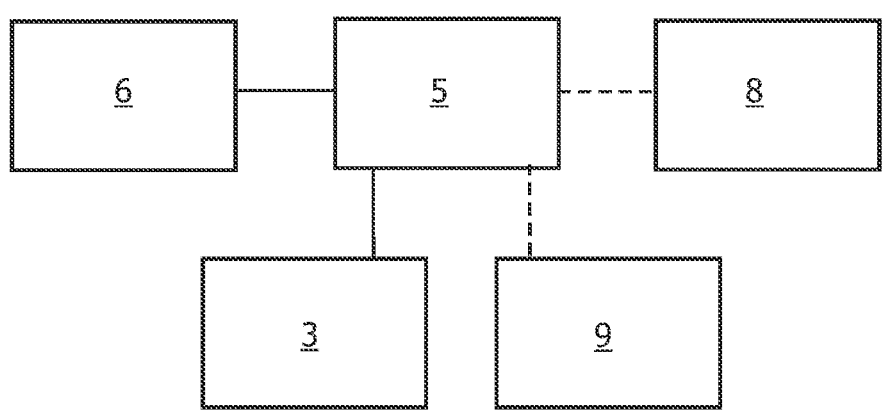
FIG. 2 shows a schematic block diagram of the embodiment, shown in FIG. 1.

A schematic block diagram of the system according to the present embodiment is shown in FIG. 2. As can be seen from FIG. 2, the system may optionally be connected to a central building control system 8 for obtaining general control parameters, such as a control preset based on temperature, daylight conditions, season, wind, etc. Furthermore, the central control system 8 may be configured with specific control parameters for the room 1, obtained in a commissioning process.

The system may further or alternatively be connected with a manual controller 9, e.g. installed in the room 1 for allowing a user to set the tilt angle of the slats 4 and the height, to which the slats 4 of the blind 3 are lowered manually, if necessary.

The system for controlling is activated by lowering the slats 4 of the blind 3 either by a manual command using the controller 9 or by a corresponding command of the central control system 8. The control unit 5 receives the respective control command and lowers the slats 4. The control unit 5 then queries the camera 6 to obtain an image signal of the desk 7.

In case direct sunlight falls through the blind 3, as schematically shown in FIG. 1, a stripe pattern 10, formed by said sunlight and alternating with the shadows of the slats 4, is present and results in discomfort due to glare and heat.

Upon reception of the image signal, the control unit 5 determines, whether said stripe pattern 10 is present and once the stripe pattern is detected, sends a corresponding control command to the blind 3 to vary the tilt angle of the slats 4. During the control of the tilt angle, the camera 6 constantly provides the control unit 5 with an image signal of the desk 7, enabling a closed-loop operation of the system to reduce the stripe pattern 10.

According to the present embodiment, the control unit 5 determines, whether the stripe pattern 10 is present using an image recognition algorithm based on edge detection.

The control unit 5 then determines the luminance contrast ratio of stripes of the stripe pattern, i.e. by comparing the stripe having the highest luminance with the stripe having the lowest luminance. A control of the blind 3 is conducted in case the contrast ratio is higher than 10:2, to reduce glare, or lower than 10:4, to provide a room user with a view to the outside through the window 2. The control unit 5 is configured with a hysteresis and controls the tilt angle of the slats 4 to a target contrast ratio of 10:3.

The tilt angle of the slats 4 is thus controlled to an optimum position for reducing glare, while maintaining a view to the outside, i.e. the blind 3 is only closed as far as necessary to reduce glare.

Figure 3:
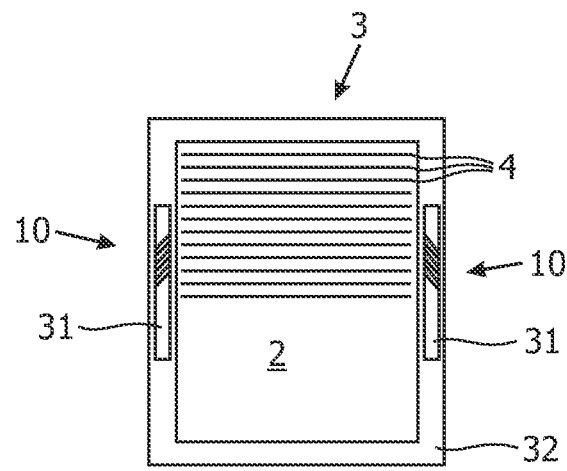
FIG. 3 shows a second embodiment of a system according to the invention.

Additionally or alternatively to the arrangement of the camera 6, observing the room 1, sensor modules 31 may be provided on the window frame 32 of the window 2, as shown in a second embodiment of the inventive system in FIG. 3.

The embodiment of FIG. 3 corresponds to the embodiment of FIGS. 1 and 2, with the exception that instead of a camera 6, two sensor modules 31 are arranged on the window frame 32 of the window 2 to detect the stripe pattern 10, allowing a very compact setup of the system.

The sensor modules 31 comprise e.g. linear sensor arrays of the type MRX90255BC, available from Melexis Corp. The details of the operation of the embodiment of FIG. 3 correspond to the embodiment of FIGS. 1 and 2.

Figure 4:
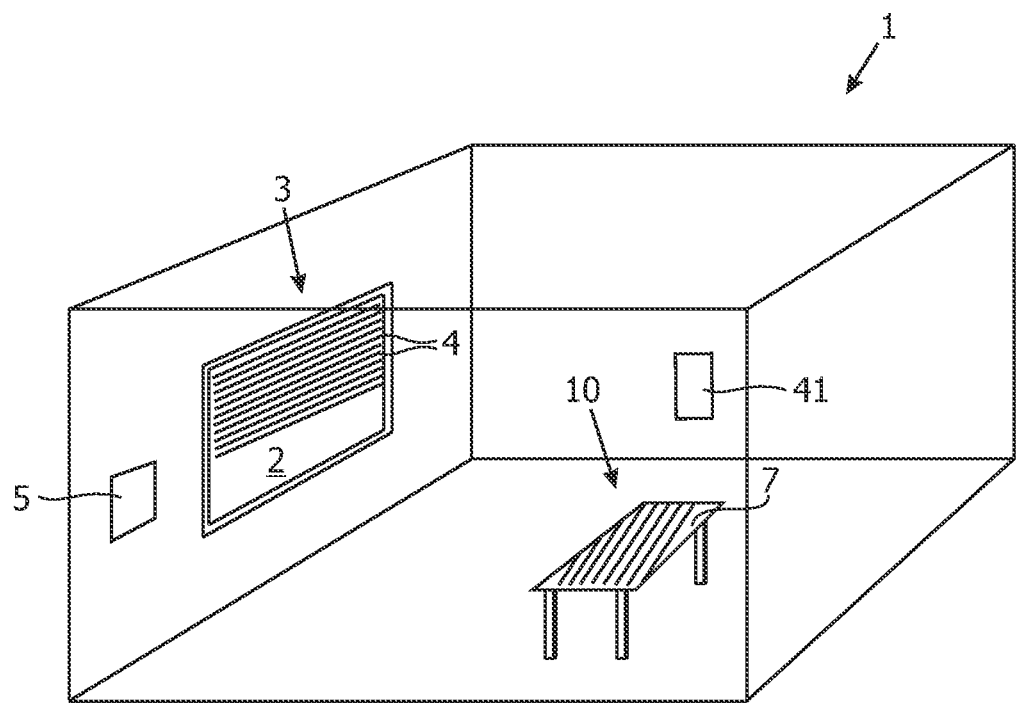
FIG. 4 shows a third embodiment of a system according to the invention and FIG. 5 shows a flow diagram of an exemplary method of controlling a shading device according to the embodiment of FIG. 4.
Figure 5:
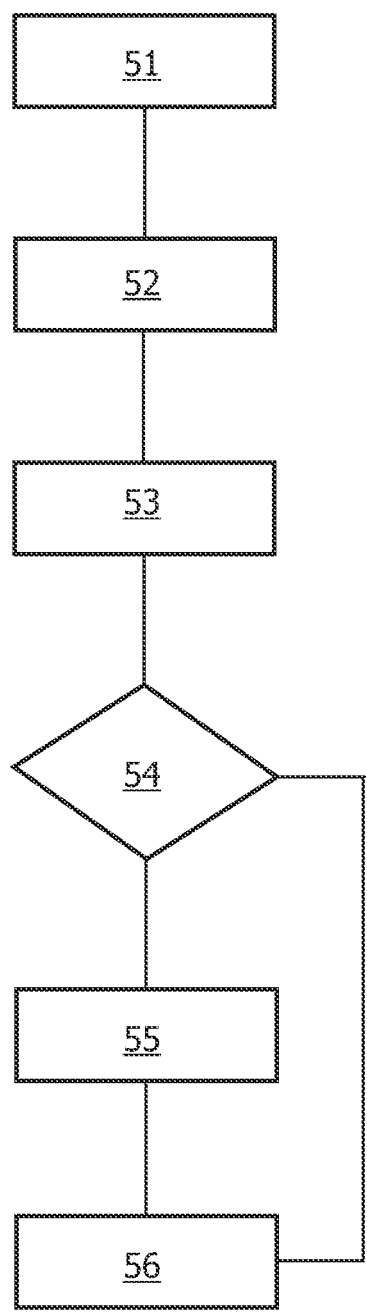

A third embodiment of the inventive system for controlling a shading device is shown in FIG. 4 in a three-dimensional view of the room 1. The present embodiment corresponds substantially to the embodiment of FIG. 1, but instead of a camera 6, a photodiode 41 is arranged in the room 1, connected to the control unit 5. The operation of the system, shown in FIG. 4 is hereinafter explained with the reference to the flow diagram of FIG. 5.

According to the present embodiment, a detection of glare resulting from direct light, transmitted through the shading device, is based on the detection of a change of the gradient of the luminance in the room 1 when varying the tilt angle of the slats 4.

In present embodiment, the control unit 5 is configured for conducting a calibration procedure, which is initiated in step 51 by the control unit 5 in response to a control command of the central control system 8 or of the manual controller 9. Alternatively, the procedure may be conducted on a periodic basis, e.g. every two hours.

The control unit 5 is configured to vary the tilt angle of the slats 4 in step 52, e.g. from a completely closed position to an opened position. While varying the tile angle, the control unit 5 receives a luminance signal of said photodiode 41, thus a luminance value for each setting of the tilt angle is obtained and stored in a suitable memory of the control unit 5.

In step 53, the control unit 5 calculates the gradient of the luminance signal and determines in step 54, whether a substantial change, e.g. a discontinuity in the gradient is present by calculating the second derivative of the luminance signal and determining the highest peak of said second derivative.

If such a substantial change is present, the tilt angle of the slats 4 is controlled in step 55 by the control unit 5 to a setting, corresponding to the substantial change in the gradient and the procedure ends in step 56. In case no substantial change in the gradient is determined, the procedure ends directly with the slats 4 being raised or with an angular position being set that maximizes the view to the outside.

The present embodiment is based on the conclusion that while varying the tilt angle of the slats 4 of the blind 3, the luminance will vary accordingly. The gradient of the luminance signal, i.e. change of the luminance will be constant.

When varying the tilt angle from a closed state of the blind 3 to an opened state and in case that direct sunlight falls through the blind 3 at a certain angular position, the luminance will increase dramatically at this angular position. The gradient of the luminance signal thus changes. An optimum tilt angle for the slats 4, where direct light is blocked while providing a sufficient view through the blind 3 is obtained.

Several modifications to the above embodiments are possible:

The system may be used for controlling more than one blind 3 or for controlling only a group of slats 4 of the blind 3.

In case only a group of the slats 4 are controlled, a further group may be used for redirecting light into the room, also referred to as "daylight harvesting" according to a method disclosed in "A System for Optimizing Interior Daylight Distribution Using Reflective Venetian Blinds with Independent Blind Angle Control", by Molly E. McGuire, Master Thesis at the Massachusetts Institute of Technology, June 2005, and the references cited therein.

Instead of using a camera 6 or a sensor module 31, an organic multilayer photo diode may be used for providing an image signal, for example of the type disclosed in "H. Tanaka, T. Yasuda, K. Fujita, T. Tsutsui, Transparent image sensors using an organic multilayer photodiode, Advanced Materials, 2006, Vol. 18, p. 2230-2233".

Alternatively, a sensor array of the type disclosed in "Tse Nga Ng, et. al, Low temperature a-Si: Photodiodes and flexible image sensor arrays patterned by digital lithography, Applied Physics Letters, 2007, Vol. 91, 0635050, 3 pages" may be used.

In a further alternative, a photodiode, as described in "M. Yahaya et. al, Fabrication of photodiode by screen printing technique, Proceedings IEEE, ICSE 1998, p. 254-259" may be used.

Alternatively to the setup of the embodiment of FIG. 3, the stripe pattern may be mapped onto the surface of a linear sensor by suitable imaging optics. If imaging optics are used, the stripe pattern may be located on the same side of the window frame as the sensor module 31 or they may be located on the opposite side.

The invention has been illustrated and described in detail in the drawings and the foregoing description. Such illustration and description are to be considered illustrative or exemplary and not restrictive; the invention is not limited to disclose embodiments.

In the claims, the word "comprising" does not exclude other elements and the indefinite article "a" or "an" does not exclude a plurality. The mere effect that certain measures are recited in mutually different dependent claims does not indicate that a combination of these measures cannot be used to advantage. Any reference signs in the claims should not be construed as limiting the scope.

LIST OF REFERENCE SIGNS 1 room
2 window
3 blind
4 slats
5 control unit
6 camera
7 desk
8 central control system
9 manual controller
10 stripe pattern
31 sensor module
32 window frame
41 photodiode

The invention claimed is:

1. System for controlling a shading device with a plurality of controllable shading elements, comprising
at least one detector unit for providing an image signal of a shading area and
a control unit being configured to
receive said image signal,
determine from said signal, whether a characteristic pattern is present in said shading area, wherein said pattern is a geometric pattern formed in said shading area by light passing through said shading device, and
in case said characteristic pattern is determined to be present in said shading area, control said shading elements to reduce said characteristic pattern.

2. System according to claim 1, wherein at least the angular position of said shading elements is controllable and said control unit is adapted to control at least said angular position to reduce said characteristic pattern.

3. System according to claim 1, wherein said characteristic pattern is a stripe pattern and said control unit is configured to determine whether a characteristic pattern is present by detecting the contrast ratio of stripes of said stripe pattern and to control said shading elements, in case said contrast ratio is higher than a maximum contrast threshold.

4. System according to claim 3, wherein said maximum contrast threshold is 10:1.

5. System according to claim 3, wherein the control unit is configured to control said shading elements, so that said contrast ratio corresponds substantially to said maximum contrast threshold.

6. System according to claim 3, wherein said control unit is configured to control said shading elements, in case said contrast ratio is lower than a minimum contrast threshold.

7. System according to claim 3, wherein said control unit is configured to control said shading elements, so that said contrast ratio is between 10:4 and 10:2.

8. Shading system having at least one shading device with plurality of controllable shading elements and a system for controlling said shading device according to claim 1.

9. Method of controlling a shading device with a plurality of controllable shading elements, comprising receiving an image signal of a shading area, determining from said signal, whether a characteristic pattern is present in said shading area, wherein said pattern is a geometric pattern formed in said shading area by light passing through said shading device, and in case said characteristic pattern is determined to be present in said shading area, controlling said shading elements to reduce said characteristic pattern.

10. System for controlling a shading device with a plurality of shading elements, wherein said shading elements have at least one controllable parameter, comprising at least one detector unit for providing a luminance signal of a shading area and a control unit being configured to vary said at least one controllable parameter, receive said luminance signal, calculate a gradient of said luminance signal, determine a parameter setting from said gradient for said at least one controllable parameter and control said shading elements with said parameter setting.

11. The system of claim 10, wherein the control unit is further configured to determine the parameter setting from said gradient by assessing a change of said gradient for different parameter setting values of said at least one controllable parameter.

12. The system of claim 11, wherein the assessing comprises determining the second derivative of said luminance signal.

13. Method of controlling a shading device with a plurality of shading elements, wherein said shading elements have at least one controllable parameter, comprising the steps of varying said at least one controllable parameter, receiving a luminance signal of a shading area, calculating a gradient of said luminance signal, determining a parameter setting from said gradient for said at least one controllable parameter and controlling said shading elements with said parameter setting.

14. The method of claim 13, wherein said determining comprises assessing a change of said gradient for different parameter setting values of said at least one controllable parameter.

15. The method of claim 14, wherein the assessing comprises determining the second derivative of said luminance signal.

* * * * *